US012581186B2

(12) United States Patent
Sasai et al.

(10) Patent No.: US 12,581,186 B2
(45) Date of Patent: Mar. 17, 2026

(54) IMAGE PICKUP APPARATUS, CONTROL METHOD FOR IMAGE PICKUP APPARATUS, AND STORAGE MEDIUM CAPABLE OF EASILY RETRIEVING DESIRED-STATE IMAGE AND SOUND PORTIONS FROM IMAGE AND SOUND AFTER SPECIFIC SOUND IS GENERATED THROUGH ATTRIBUTE INFORMATION ADDED TO IMAGE AND SOUND

(71) Applicant: CANON KABUSHIKI KAISHA, Tokyo (JP)

(72) Inventors: Kenichiro Sasai, Kanagawa (JP); Shogo Fujiwara, Tokyo (JP); Tatsuo Nishino, Kanagawa (JP); Yudai Itoi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 398 days.

(21) Appl. No.: 18/470,792

(22) Filed: Sep. 20, 2023

(65) Prior Publication Data

US 2024/0107151 A1      Mar. 28, 2024

(30) Foreign Application Priority Data

Sep. 22, 2022    (JP) ................................. 2022-151345

(51) Int. Cl.
*H04N 23/60*        (2023.01)
*G10L 25/51*        (2013.01)
    (Continued)

(52) U.S. Cl.
CPC ............. *H04N 23/64* (2023.01); *G10L 25/51* (2013.01); *H04N 23/611* (2023.01);
    (Continued)

(58) Field of Classification Search
CPC ...... H04N 23/64; H04N 23/611; H04N 23/62; G10L 25/51; H04R 1/028; H04R 2499/11; H04R 1/406; H04R 2430/20
See application file for complete search history.

(56) References Cited

U.S. PATENT DOCUMENTS

2011/0013075 A1*   1/2011   Kim ....................... H04N 7/147
                                                                    348/370
2017/0265012 A1*   9/2017   Tico ......................... H04S 7/303
                              (Continued)

FOREIGN PATENT DOCUMENTS

CN          216313221 U   *   4/2022
JP          2016-504656 A      2/2016
JP          2020-150360 A      9/2020

OTHER PUBLICATIONS

CN 216313221 Translation (Year: 2022).*

*Primary Examiner* — Sinh Tran
*Assistant Examiner* — Angel L Garces-Rivera
(74) *Attorney, Agent, or Firm* — Cowan, Liebowitz & Latman, P.C.

(57) ABSTRACT

An image pickup apparatus capable of easily retrieving desired-state image and sound portions through attribute information is provided. The image pickup apparatus includes an image pickup circuit, a CPU, and a memory that stores a program that, when executed by the CPU, causes the image pickup apparatus to function as the following units a sound acquisition unit that acquires a sound, a sound recognition unit that recognizes a sound acquired during moving image capturing and detects a specific sound from the sound, an image recognition unit that recognizes a moving image acquired during the moving image capturing and detects a subject from the moving image, and a control unit that calculates an evaluation result by using a score weighted in response to a sound recognition result and an image (Continued)

recognition result and adds the evaluation result to the moving image and the sound as attribute information.

16 Claims, 6 Drawing Sheets

(51) Int. Cl.
  *H04N 23/611*        (2023.01)
  *H04N 23/62*         (2023.01)
  *H04R 1/02*          (2006.01)
(52) U.S. Cl.
  CPC ............. *H04N 23/62* (2023.01); *H04R 1/028*
                (2013.01); *H04R 2499/11* (2013.01)

(56)                References Cited

U.S. PATENT DOCUMENTS

| | | | |
|---|---|---|---|
| 2018/0117762 A1* | 5/2018 | Earwood ................ | B25J 9/1605 |
| 2019/0236416 A1* | 8/2019 | Wang ................... | H04N 5/2628 |
| 2020/0296321 A1* | 9/2020 | Haraguchi ............ | H04N 5/772 |
| 2021/0204023 A1* | 7/2021 | Knox .............. | H04N 21/42201 |

* cited by examiner

HIGH ⟸ WEIGHTED SCORE ⟹ LOW

| RECOGNITION METHOD | EVALUATION ITEM | 5 POINTS | 4 POINTS | 3 POINTS | 2 POINTS | 1 POINTS | 0 POINTS |
|---|---|---|---|---|---|---|---|
| IMAGE RECOGNITION | SUBJECT DETECTION | SUBJECT DETECTED | - | - | - | - | NO SUBJECT DETECTED |
| | FACE ORIENTATION | FRONT | OBLIQUE | LATERAL | REAR | - | NO FACE DETECTED |
| | FACIAL EXPRESSION | SMILING FACE WITH OPENED MOUTH | SMILING FACE WITH CLOSED MOUTH | - | NO SMILING FACE | - | NO INFORMATION |
| | NUMBER OF SUBJECTS | 1 PERSON | 2 PERSONS | 3 PERSONS | 4 PERSONS | 5 PERSONS OR MORE | 0 PERSONS |
| SOUND RECOGNITION | LOUDNESS OF SPECIFIC SOUND | LARGE | MEDIUM | SMALL | - | - | LESS THAN SMALL |
| | LENGTH OF SPECIFIC SOUND | 30 SECONDS OR MORE | 20 SECONDS OR MORE AND LESS THAN 30 SECONDS | 10 SECONDS OR MORE AND LESS THAN 20 SECONDS | 5 SECOND OR MORE AND LESS THAN 10 SECONDS | 1 SECOND OR MORE AND LESS THAN 5 SECONDS | LESS THAN 1 SECOND |

HIGH ⟸ WEIGHTED SCORE ⟹ LOW

| RECOGNITION METHOD | EVALUATION ITEM | 5 POINTS | 4 POINTS | 3 POINTS | 2 POINTS | 1 POINTS | 0 POINTS |
|---|---|---|---|---|---|---|---|
| IMAGE RECOGNITION | SUBJECT DETECTION | SUBJECT DETECTED | – | – | – | – | NO SUBJECT DETECTED |
| | FACE ORIENTATION | FRONT | OBLIQUE | LATERAL | REAR | – | NO FACE DETECTED |
| | FACIAL EXPRESSION | SMILING FACE WITH OPENED MOUTH | SMILING FACE WITH CLOSED MOUTH | – | NO SMILING FACE | – | NO INFORMATION |
| | NUMBER OF SUBJECTS | 1 PERSON | 2 PERSONS | 3 PERSONS | 4 PERSONS | 5 PERSONS OR MORE | 0 PERSONS |
| SOUND RECOGNITION | LOUDNESS OF SPECIFIC SOUND | LARGE | MEDIUM | SMALL | – | – | LESS THAN SMALL |
| | LENGTH OF SPECIFIC SOUND | 30 SECONDS OR MORE | 20 SECONDS OR MORE AND LESS THAN 30 SECONDS | 10 SECONDS OR MORE AND LESS THAN 20 SECONDS | 5 SECONDS OR MORE AND LESS THAN 10 SECONDS | 1 SECOND OR MORE AND LESS THAN 5 SECONDS | LESS THAN 1 SECOND |
| | LENGTH OF TIME REQUIRED TO CHANGE ANGLE OF VIEW TO SOUND DIRECTION | LESS THAN 1 SECOND | 1 SECOND OR MORE AND LESS THAN 2 SECONDS | 2 SECONDS OR MORE AND LESS THAN 3 SECONDS | 3 SECONDS OR MORE AND LESS THAN 4 SECONDS | 4 SECONDS OR MORE AND LESS THAN 5 SECONDS | 5 SECONDS OR MORE |

IMAGE PICKUP APPARATUS, CONTROL METHOD FOR IMAGE PICKUP APPARATUS, AND STORAGE MEDIUM CAPABLE OF EASILY RETRIEVING DESIRED-STATE IMAGE AND SOUND PORTIONS FROM IMAGE AND SOUND AFTER SPECIFIC SOUND IS GENERATED THROUGH ATTRIBUTE INFORMATION ADDED TO IMAGE AND SOUND

BACKGROUND OF THE INVENTION

Field of the Invention

The present invention relates to an image pickup apparatus, a control method for an image pickup apparatus, and a storage medium.

Description of the Related Art

Conventionally, there has been known an image pickup apparatus that records image data and attribute information thereof. For example, Japanese Laid-Open Patent Publication (kokai) No. 2020-150360 discloses a technique for recording a sound generation direction as attribute information. Further, Japanese Unexamined Patent Application Publication (Translation of PCT Application) No. 2016-504656 discloses a technique for improving accuracy of attribute information. In the technique described in Japanese Unexamined Patent Application Publication (Translation of PCT Application) No. 2016-504656, features of subjects are extracted from images, and a plurality of attribute scores is generated based on attribute classification. In addition, subject similarity measures are generated on the basis of the extracted subject features. Furthermore, the attribute scores are corrected based on the correlations between the respective extracted subject similarity measures and the plurality of attribute scores.

However, in the technique disclosed in Japanese Unexamined Patent Application Publication (Translation of PCT Application) No. 2016-504656, since the attribute scores are generated only on the basis of the image information, even though the attribute scores are referred to, it is difficult to retrieve a subject after a specific sound is generated from a video. The video, in which the subject after the specific sound is generated is captured, is useful for a user. For example, it is effective in easily finding a scene where a child is laughing after the user photographs the child. Alternatively, it is effective in easily finding and confirming a situation when a noise occurred from images photographed by a security camera. On the other hand, in the technique disclosed in Japanese Laid-Open Patent Publication (kokai) No. 2020-150360, although it is possible to retrieve the subject after the specific sound is generated from the video with reference to attribute information that is the sound generation direction, it is not always the case that the subject is captured in a desirable state in the retrieved image.

SUMMARY OF THE INVENTION

The present invention provides an image pickup apparatus, a control method for an image pickup apparatus, and a storage medium capable of easily retrieving desired-state image and sound portions from an image and a sound after a specific sound is generated through attribute information added to the image and the sound.

Accordingly, the present invention provides an image pickup apparatus comprising an image pickup circuit, a CPU, and a memory that stores a program that, when executed by the CPU, causes the image pickup apparatus to function as the following units a sound acquisition unit that acquires a sound, a sound recognition unit that recognizes a sound acquired by the sound acquisition unit during moving image capturing performed by the image pickup circuit and detects a specific sound from the sound, an image recognition unit that recognizes a moving image acquired by the image pickup circuit during the moving image capturing performed by the image pickup circuit and detects a subject from the moving image, and a control unit that calculates an evaluation result by using a score weighted in response to a sound recognition result acquired by the sound recognition unit and an image recognition result acquired by the image recognition unit and adds the evaluation result to the moving image and the sound as attribute information. The control unit does not add the attribute information including the evaluation result from a start of capturing of the moving image until the sound recognition unit detects the specific sound and adds the attribute information including the evaluation result after the sound recognition unit detects the specific sound.

According to the present invention, it is possible to easily retrieve the desired-state image and sound portions from the image and the sound after the specific sound is generated through the attribute information added to the image and the sound.

Further features of the present invention will become apparent from the following description of exemplary embodiments with reference to the attached drawings.

BRIEF DESCRIPTION OF THE DRAWINGS

FIG. 3 is a diagram that shows a score table used in calculating attribute information.

FIG. 6 is a diagram that shows a variation of the score table used in calculating the attribute information.

DESCRIPTION OF THE EMBODIMENTS

The present invention will now be described in detail below with reference to the accompanying drawings showing embodiments thereof.

Hereinafter, an embodiment of the present invention will be described in detail with reference to the drawings. However, the configuration described in the present embodiment is merely an example, and the scope of the present invention is not limited by the configuration described in the present embodiment. For example, each part constituting the present invention can be replaced with a part having any configuration capable of exhibiting similar functions. In addition, any component may be added. Furthermore, any two or more configurations (features) of the present embodiment can be combined.

Figure 1:
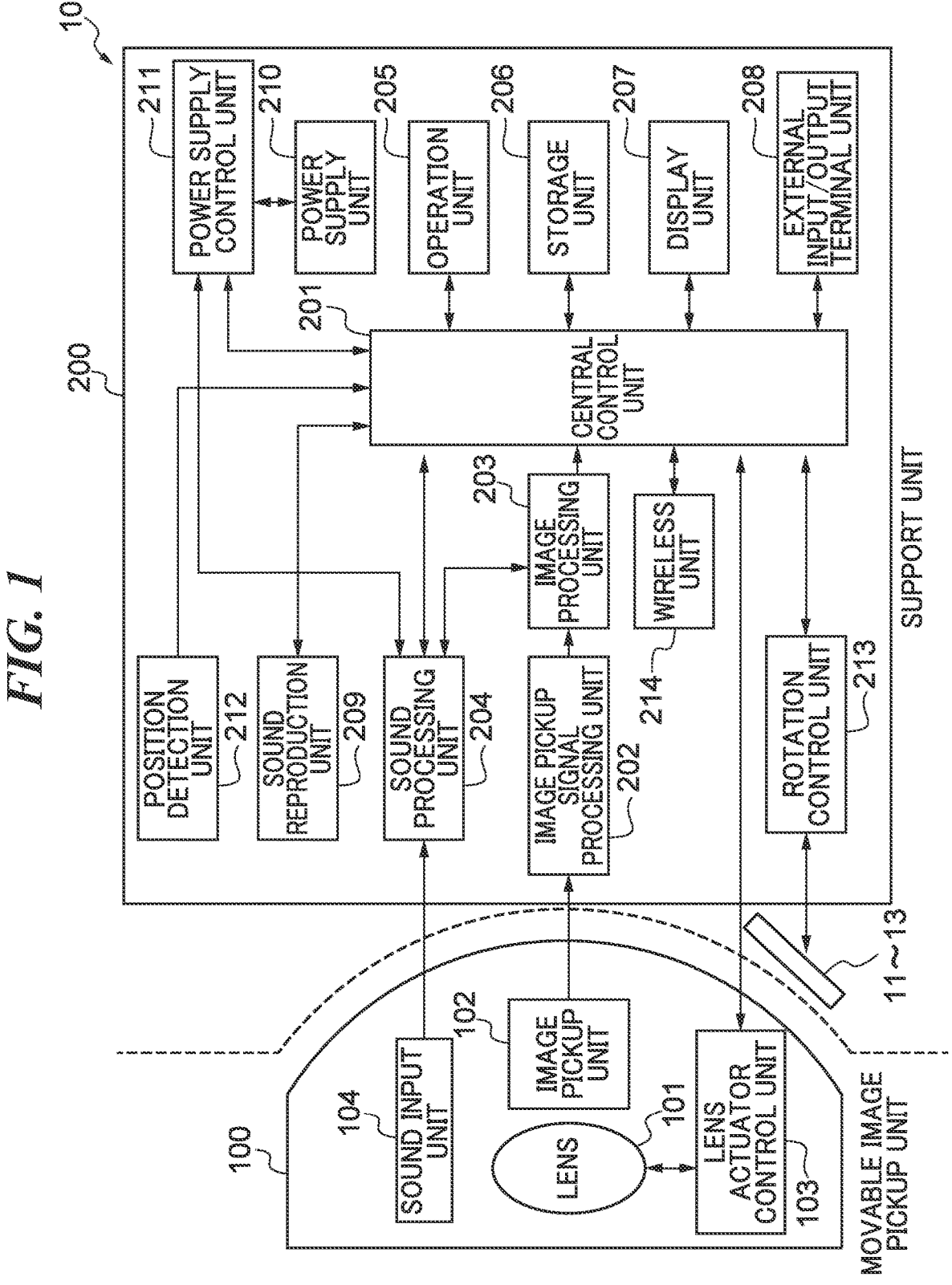
FIG. 1 is a block diagram that shows an image pickup apparatus according to an embodiment of the present invention.

FIG. 1 is a block diagram that shows an image pickup apparatus 10 according to the present embodiment. As shown in FIG. 1, the image pickup apparatus 10 includes a movable image pickup unit 100 and a support unit 200. The movable image pickup unit 100 includes an optical lens unit and a plurality of microphones, and acquires image data and sound data. The support unit 200 includes a control unit that controls driving of the movable image pickup unit 100 and a central control unit (a CPU) that controls the entire image pickup apparatus 10. It should be noted that the support unit 200 is configured to enable the movable image pickup unit 100 to move in any direction by using a plurality of movable image pickup unit control actuators 11 to 13. In the present embodiment, the image pickup apparatus 10 functions as a digital camera. However, the image pickup apparatus 10 is not limited to the digital camera, and may be, for example, a digital camera, a video camera, a smartphone, a tablet terminal, or the like that is attached to a camera platform. Furthermore, the image pickup apparatus 10 may be a digital camera, a video camera, a smartphone, a tablet terminal, or the like that performs photographing manually.

First, the configuration of the movable image pickup unit 100 will be described. A lens 101 is a lens unit. In the lens 101, an image capturing optical system (a photographing optical system) is configured by a zoom unit, a diaphragm and shutter unit, a focus unit, etc. The image pickup unit 102 (an image pickup circuit) includes an image pickup device such as a complementary metal oxide semiconductor (CMOS) sensor or a charge coupled device (CCD) sensor, photoelectrically converts an optical image formed by (each lens group of) the image capturing optical system, and outputs electrical signals. A lens actuator control unit 103 includes a motor driver integrated circuit (a motor driver IC), and drives respective actuators such as the zoom unit, the diaphragm and shutter unit, the focus unit of the lens 101. Driving of the respective actuators is performed on the basis of actuator drive instruction data received from a central control unit 201 that will be described below. A sound input unit 104 (a sound acquisition unit) includes the plurality of microphones, and converts an acquired sound into digital data, and outputs the digital data.

Next, the configuration of the support unit 200 will be described. The central control unit 201 controls the entire image pickup apparatus 10. The central control unit 201 includes a central processing unit (CPU), a read only memory (ROM) that stores programs executed by the CPU, a random access memory (RAM) that is used as a working area of the CPU, etc. In the present embodiment, the central control unit 201 incorporates a clock. The central control unit 201 measures the time on the basis of the time of the clock. An image pickup signal processing unit 202 converts the electrical signals outputted from the image pickup unit 102 into image data. An image processing unit 203 processes the image data outputted from the image pickup signal processing unit 202 according to the purpose of use. The image processing unit 203 also performs processes such as image cutout and electronic image stabilization operation by rotation processing. Furthermore, the processes performed by the image processing unit 203 (an image recognition unit) include subject detection and detection of a face orientation, a facial expression, the number of subjects, etc. that are performed by image recognition.

A sound processing unit 204 performs a sound processing with respect to the sound data from the sound input unit 104. In the case that the sound input unit 104 outputs sound signals as analog signals, the sound processing unit 204 includes a configuration that converts the sound signals into digital signals. It should be noted that the sound processing unit 204 including the sound input unit 104 will be described in detail below. An operation unit 205 is provided to operate the image pickup apparatus 10. The operation unit 205 is an interface unit for interfacing with a user that displays information within the image pickup apparatus 10, and is provided with a liquid crystal display (an LCD) having a touch panel function.

A storage unit 206 is provided to store various types of data such as image data and sound data acquired by moving image capturing (moving image photographing). When storing a moving image (a video), which is the image data, and the sound data in the storage unit 206, the central control unit 201 adds attribute information regarding the photographed moving image to the image data and the sound data, and then stores the image data and the sound data in the storage unit 206. The attribute information is represented by a total score obtained by totaling up scores given to evaluation items such as the subject detection, the face orientation, the facial expression, the number of subjects, a loudness of a specific sound, and a length of the specific sound after a timing at which the specific sound has been detected. These evaluation items will be described in detail below. It should be noted that the evaluation items for calculating the total score (an evaluation result) that is the attribute information are not limited to the above-described evaluation items, and may include another evaluation item such as a time required to change an angle of view to a direction in which the specific sound has arrived (a sound direction).

A display unit 207 includes a display such as an LCD. If necessary, the central control unit 201 performs image display on the display unit 207 on the basis of the signals outputted from the image processing unit 203. An external input/output terminal unit 208 communicates with an external device. In addition, the external input/output terminal unit 208 inputs and outputs the image data and the sound data into and from the external device. A sound reproduction unit 209 includes a speaker, converts the sound data into electrical signals, and outputs the electrical signals. A power supply unit 210 supplies power to the entire image pickup apparatus 10 (each component of the image pickup apparatus 10) according to the purpose of use. A power supply control unit 211 performs control to individually start and stop a power supply different from the power supply unit 210. A position detection unit 212 includes a gyro sensor, an acceleration sensor, and the like, and detects a movement of the image pickup apparatus 10.

A rotation control unit 213 is able to move the movable image pickup unit 100 in any direction at any speed by energizing the movable image pickup unit control actuators 11 to 13 in response to an instruction from the user. It should be noted that although the movable image pickup unit control actuators 11 to 13 include three vibrators, the number of the actuators is not limited to three, and the type of the actuator is not limited to the vibrator. The rotation control unit 213 realizes multi-degree-of-freedom driving of the movable image pickup unit 100 by appropriately operating some or all of the plurality of vibrators. Furthermore, the central control unit 201 judges a direction in which the image pickup apparatus 10 is facing (an image capturing direction (a photographing direction)), that is, judges a direction in which the image pickup unit 102 of the movable image pickup unit 100 is facing, by communication with the rotation control unit 213. It should be noted that the judgement of the image capturing direction is not limited to what is described above, and may be performed, for example, by using an orientation sensor or the like. A wireless unit 214 performs communication of data such as the image data and the sound data in accordance with a wireless standard such as Wi-Fi (registered trademark) or Bluetooth (registered trademark) low energy (BLE).

Figure 2:
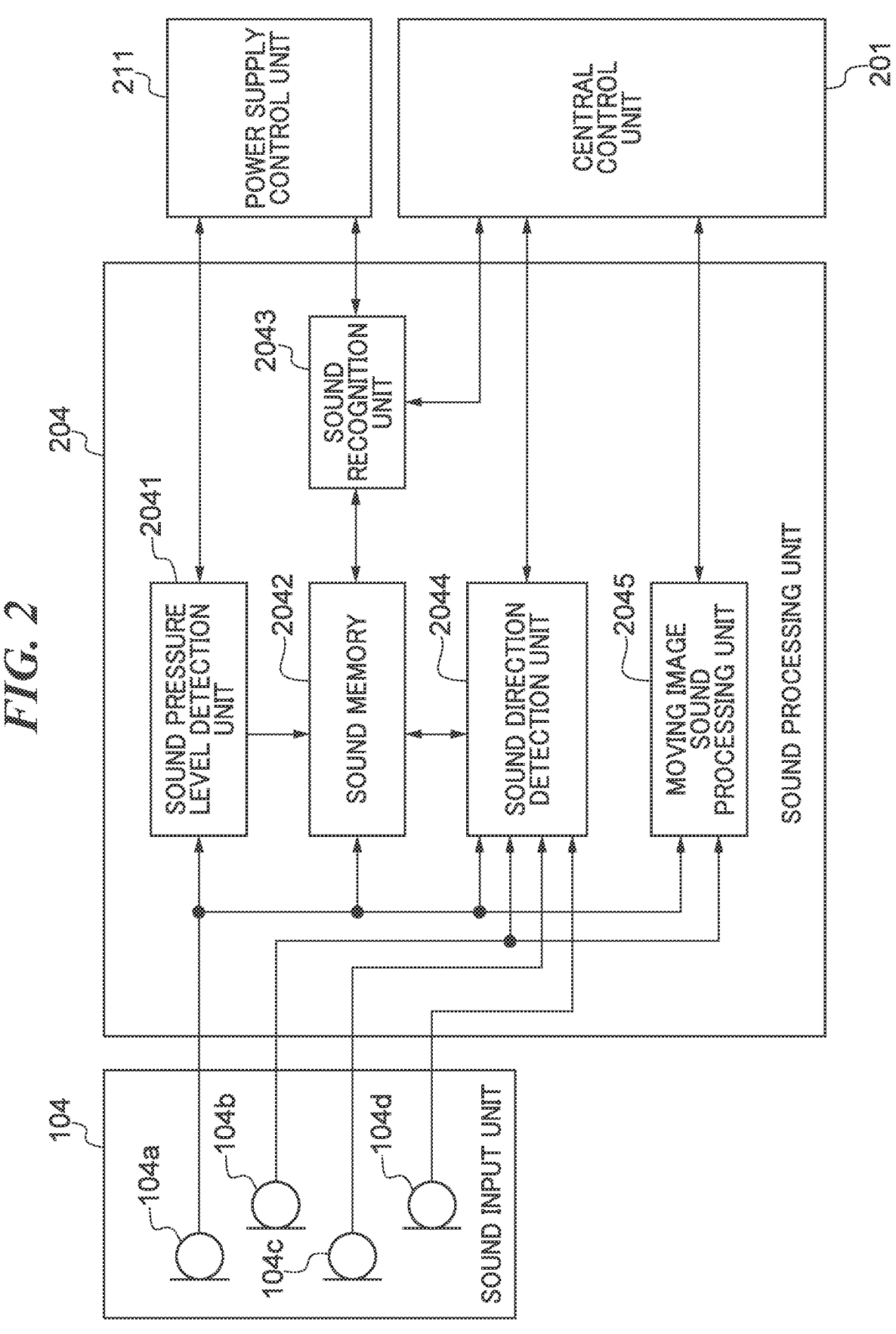
FIG. 2 is a block diagram that shows a sound input unit and a sound processing unit of the image pickup apparatus.

FIG. 2 is a block diagram that shows the sound input unit 104 and the sound processing unit 204 of the image pickup apparatus 10. The sound input unit 104 includes a microphone 104a, a microphone 104b, a microphone 104c, and a microphone 104d. Each of the microphones 104a to 104d is a non-directional microphone (a digital microphone) having an A/D function. The sound input unit 104 includes the digital microphones as described above, but is not limited thereto, and may include analog-output microphones. In addition, the sound input unit 104 includes four microphones, but is not limited thereto, and only needs to include two or more microphones.

The sound processing unit 204 includes a sound pressure level detection unit 2041, a sound memory 2042, a sound recognition unit 2043 (a sound recognition unit), a sound direction detection unit 2044 (a judging unit), and a moving image sound processing unit 2045. The sound pressure level detection unit 2041 detects that an output level of the microphone 104a is equal to or higher than a threshold. In the sound memory 2042, data on children's characteristic voices such as children's laughing voices, children's crying voices, and children's singing voices is stored in advance as sound data for a command. Further, in the sound memory 2042, output data (the sound data) of the microphone 104a is sequentially stored in response to an output signal from the sound pressure level detection unit 2041.

The sound recognition unit 2043 compares the specific sound data stored in advance in the sound memory 2042 with the sound data sequentially stored in the sound memory 2042, and judges whether or not the two compared pieces of sound data match each other. As a result, the sound recognition unit 2043 is able to recognize and detect a specific sound. Furthermore, the sound recognition unit 2043 is also able to analyze the sound data sequentially stored in the sound memory 2042, and judge whether or not the sequentially-stored sound data includes a specific frequency component. As a result, the sound recognition unit 2043 is able to recognize and detect a sound including the specific frequency component as the specific sound.

Furthermore, the sound recognition unit 2043 is also able to analyze the sound data sequentially stored in the sound memory 2042, and judge whether or not the sequentially-stored sound data includes a sound exceeding a specific sound pressure level. As a result, the sound recognition unit 2043 is able to recognize and detect the sound exceeding the specific sound pressure level as the specific sound. Furthermore, the sound recognition unit 2043 is also able to analyze a sound included in the sound data sequentially stored in the sound memory 2042, and judge whether or not a specific word is included in the sound included in the sound data sequentially stored in the sound memory 2042. As a result, the sound recognition unit 2043 is able to recognize and detect the sound including the specific word as the specific sound. Furthermore, the sound recognition unit 2043 is also able to analyze a sound included in the sound data sequentially stored in the sound memory 2042, and estimate an emotion of a person who has made the sound included in the sound data sequentially stored in the sound memory 2042. As a result, the sound recognition unit 2043 is able to recognize and detect the sound, from which s specific emotion is estimated, as the specific sound.

Furthermore, the sound recognition unit 2043 is able to analyze the sound data sequentially stored in the sound memory 2042, and judge a size of the sound data. In this judgement, three different reference values are used, and the size of the sound data is judged to be large, medium, small, or less than small.

The sound direction detection unit 2044 judges a direction in which a sound comes toward the image pickup apparatus 10 (a sound direction), based on the output data of the microphone 104a, the microphone 104b, the microphone 104c, and the microphone 104d. The moving image sound processing unit 2045 performs various kinds of filtering processes and a sound process for moving image sound such as wind cutting with respect to the output data of the microphone 104a and the microphone 104b. Moreover, the moving image sound processing unit 2045 performs sound processes for moving image sound, such as stereo enhancement, driving sound cancellation, auto level control (ALC), and compression processing, with respect to the output data of the microphone 104a and the microphone 104b. When performing the sound processes for moving image sound, the moving image sound processing unit 2045 handles the microphone 104a as Lch and handles the microphone 104b as Rch.

In the present embodiment, the power supply is individually controlled for each block of the sound processing unit 204 by the central control unit 201. Furthermore, if necessary, the power supply is controlled to be turned on or off for each block of the sound processing unit 204 by the central control unit 201. In addition, the power supply control unit 211 controls the power supply on the basis of information from the sound pressure level detection unit 2041 and the sound recognition unit 2043. It should be noted that, in the present embodiment, the connections between the microphones 104a to 104d of the sound input unit 104 and the blocks included in the sound processing unit 204 are minimum connections necessary for the microphones 104a to 104d in consideration of power consumption and the circuit configuration. However, the sound processing unit 204 may use a plurality of microphones among the microphone 104a, the microphone 104b, the microphone 104c, and the microphone 104d to be shared by the blocks included in the sound processing unit 204 as long as the power consumption and the circuit configuration allow such sharing. Further, in the present embodiment, although the microphone 104a is connected to the sound processing unit 204 as a reference microphone, any microphone among the microphone 104a, the microphone 104b, the microphone 104c, and the microphone 104d may be the reference microphone.

Hereinafter, a method for adding the attribute information to the image data will be described with reference to FIGS. 3 to 5. FIG. 3 is a diagram that shows a score table 301 used in calculating the attribute information. In the score table 301, scores (points) are assigned according to detection results for each evaluation item. The evaluation items differ depending on the recognition method for the image data or the sound data. The evaluation item in a case that the recognition method is image recognition is provided for each subject type. The subject types include the subject detection (the presence or absence of a person), the face orientation (an orientation of a face of the person), the facial expression (a facial expression of the person), and the number of subjects (the number of persons). As a result, it is possible to comprehensively evaluate the subjects in the image data (perform comprehensive evaluation of the subjects in the image data). The evaluation items in a case that the recognition method is sound recognition include the loudness of the specific sound and the length of the specific sound. As a result, it is possible to comprehensively evaluate the specific sound in the sound data (perform comprehensive evaluation of the specific sound in the sound data).

A score is obtained by applying the image recognition result or the sound recognition result for each evaluation item to the score table 301. The score of the score table 301 is set so that the more the image recognition result or the sound recognition result for each evaluation item matches the conditions desired by the user, the higher the score of the score table 301. For example, in a case that the image pickup apparatus 10 is disposed at a place such as a nursery school where many children gather and the attribute information is automatically added while performing moving image capturing (moving image photographing), the analysis of the image recognition result and the sound recognition result is started in response to that the laughing voice which is the characteristic voice of the child has been detected. In the analysis, a facial expression of the child who is the subject, a length of the laughing voice that is the specific sound, etc. are evaluated according to the score table 301, and the score given to each evaluation item is determined.

According to the score table 301, with respect to the evaluation item of the subject detection, 5 points are given in the case that a subject has been detected, and on the other hand, no point (0 point) is given in the case that no subject is detected. With respect to the evaluation item of the face orientation, 5 points are given in the case that the face orientation is front, 4 points are given in the case that the face orientation is oblique, 3 points are given in the case that the face orientation is lateral, and 2 points are given in the case that the face orientation is rear, but no point (0 point) is given in the case that no face is detected. With respect to the evaluation item of the facial expression, 5 points are given in the case that the facial expression is a smiling face with an opened mouth, 4 points are given in the case that the facial expression is a smiling face with a closed mouth, and 2 points are given in the case that the facial expression is not a smiling face, but no point (0 point) is given in the case that there is no information.

With respect to the evaluation item of the number of subjects, 5 points are given in the case that the number of subjects is one, 4 points are given in the case that the number of subjects is two, 3 points are given in the case that the number of subjects is three, and 2 points are given in the case that the number of subjects is four. In addition, with respect to the evaluation item of the number of subjects, 1 point is given in the case that the number of subjects is five or more, but no point (0 point) is given in the case that the number of subjects is zero. With respect to the evaluation item of the loudness of the specific sound, 5 points are given in the case that the loudness of the specific sound is large, 4 points are given in the case that the loudness of the specific sound is medium, and 3 points are given in the case that the loudness of the specific sound is small, but no point (0 point) is given in the case that the loudness of the specific sound is less than small. With respect to the evaluation item of the length of the specific sound, 5 points are given in the case that the length of the specific sound is 30 seconds or more, 4 points are given in the case that the length of the specific sound is 20 seconds or more and less than 30 seconds, 3 points are given in the case that the length of the specific sound is 10 seconds or more and less than 20 seconds, and 2 points are given in the case that the length of the specific sound is 5 seconds or more and less than 10 seconds. In addition, with respect to the evaluation item of the length of the specific sound, 1 point is given in the case that the length of the specific sound is 1 second or more and less than 5 seconds, but no point (0 point) is given in the case that the length of the specific sound is less than 1 second.

Figure 4:
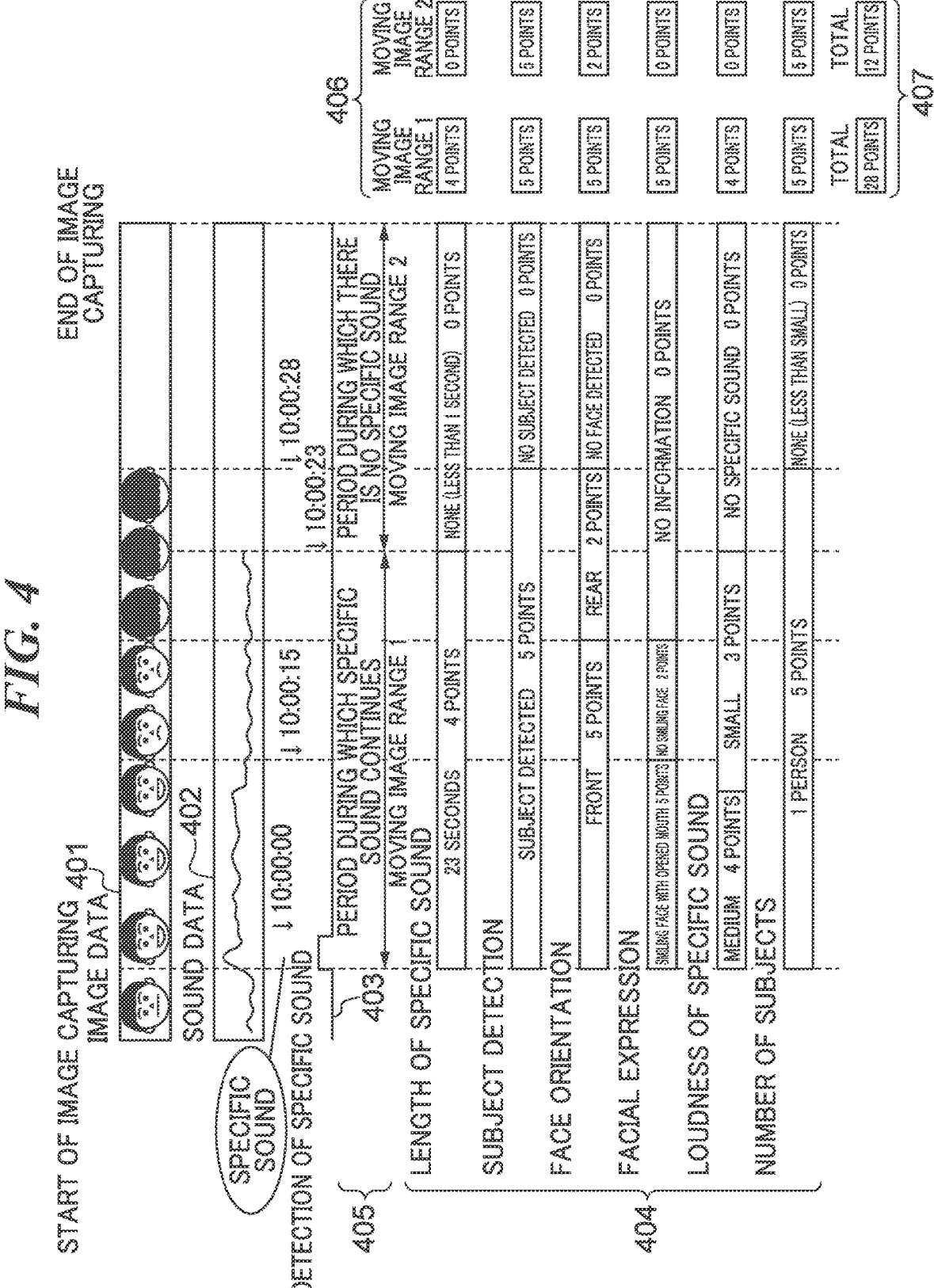
FIG. 4 is a diagram for explaining a specific example of attribute information calculated on the basis of scores corresponding to the score table.

FIG. 4 is a diagram for explaining a specific example of the attribute information calculated on the basis of the score corresponding to the score table 301. In FIG. 4, the horizontal axis represents the lapse of the time. Image data 401 and sound data 402 are acquired by moving image capturing. In the image data 401, a face of a subject included in the image-captured (photographed) moving image changes with the lapse of the time. In the sound data 402, a sound acquired by moving image capturing (photographing) changes with the lapse of the time. A reference numeral 403 denotes a timing at which a specific sound has been first detected. According to the reference numeral 403, the specific sound has been first detected at 10:00:00 after the moving image capturing is started.

A reference numeral 404 denotes the detection result of each evaluation item in the score table and the score given to the detection result of each evaluation item by the score table 301. A reference numeral 405 denotes ranges, into which a period from the timing at which the specific sound has been first detected after the moving image capturing is started (after the start of the moving image capturing) to the end of the moving image capturing is divided based on the detection result of the specific sound. According to the reference numeral 405, a moving image range 1 is from 10:00:00 when the specific sound has been first detected after the start of the moving image capturing to 10:00:23, and a moving image range 2 is from 10:00:23 to the end of the moving image capturing. A reference numeral 406 denotes scores given to the respective evaluation items of the moving image range 1 and the moving image range 2. A reference numeral 407 denotes attribute information added to the moving image range 1 and the moving image range 2.

The score given to each evaluation item will be described below. As indicated by the reference numeral 404, in the period from the timing at which the specific sound has been first detected after the start of the moving image capturing to the end of the moving image capturing, the score is given to each evaluation item. The score for the evaluation item of the length of the specific sound, is 4 points for a period of 23 seconds, and is 0 point for a period of no specific sound (less than 1 second). It should be noted that the period of 23 seconds matches the moving image range 1, and the period of no specific sound (less than 1 second) matches the moving image range 2. The score for the evaluation item of the subject detection, is 5 points for a period during which a subject has been detected, and is 0 point for a period during which no subject is detected. It should be noted that the period during which the subject has been detected is a period from 10:00:00 after the start of the moving image capturing to 10:00:28. The period during which no subject is detected is a period from 10:00:28 to the end of the moving image capturing.

The score for the evaluation item of the face orientation, is 5 points for a period during which the face orientation is front, is 2 points for a period during which the face orientation is rear, and is 0 point for a period during which no face is detected. It should be noted that the period during which no face is detected is the period from 10:00:28 to the end of the moving image capturing. The score for the evaluation item of the facial expression, is 5 points for a period during which the facial expression is a smiling face with an opened mouth, is 2 points for a period during which there is no smiling face, and is 0 point for a period during which there is no information. It should be noted that the period during which the facial expression is the smiling face with the opened mouth is a period from 10:00:00 after the start of the moving image capturing to 10:00:15.

The score for the evaluation item of the loudness of the specific sound, is 4 points for a period during which the loudness of the specific sound is medium, is 3 points for a period during which the loudness of the specific sound is small, and is 0 point for a period during which there is no specific sound (the loudness of the specific sound is less than small). It should be noted that the period during which there is no specific sound (the loudness of the specific sound is less than small) is the period from 10:00:28 to the end of the moving image capturing. The score for the evaluation item of the number of subjects, is 5 points for a period during which the number of subjects is one, and is 0 point for a period during which the number of subjects is zero. It should be noted that the period during which the number of subjects is one is the period from 10:00:00 after the start of the moving image capturing to 10:00:28. The period during which the number of subjects is zero is the period from 10:00:28 to the end of the moving image capturing. Furthermore, as indicated by the reference numeral 405, in the image data 401 and the sound data 402, a period during which the specific sound continues is set to be one divided moving image range. Therefore, in the image data 401 and the sound data 402, the period from the timing at which the specific sound has been first detected after the start of the moving image capturing to the end of the moving image capturing is divided into the moving image range 1 that is the period during which the specific sound continues and the moving image range 2 that is the period during which there is no specific sound.

In the moving image range 1, in the case that only one of the above-described scores for each evaluation item is given to each evaluation item, the score given to each evaluation item is adopted, and in the case that two or more of the above-described scores for each evaluation item are given to each evaluation item, the largest score among the two or more scores is adopted. That is, in the case that the subject detection, the face orientation, the facial expression, the loudness of the specific sound, or the number of subjects changes during the period of the moving image range 1, the largest score is given to each evaluation item. Furthermore, a total score of the scores given to the respective evaluation items is set to be attribute information 407 added to the moving image range 1 of the image data 401 and the sound data 402.

Therefore, as indicated by the reference numeral 406, the score given to the evaluation item of the length of the specific sound is 4 points for the period of 23 seconds. The score given to the evaluation item of the subject detection is 5 points for the period during which the subject has been detected. The score given to the evaluation item of the face orientation is 5 points, which is the largest score among 5 points for the period during which the face orientation is front and 2 points for the period during which the face orientation is rear. The score given to the evaluation item of the facial expression is 5 points, which is the largest score among 5 points for the period during which the facial expression is the smiling face with the opened mouth, 2 points for the period during which there is no smiling face, and 0 point for the period during which there is no information. The score given to the evaluation item of the loudness of the specific sound is 4 points, which is the largest score among 4 points for the period during which the loudness of the specific sound is medium and 3 points for the period during which the loudness of the specific sound is small. The score given to the evaluation item of the number of subjects is 5 points for the period during which the number of subjects is one. As described above, the attribute information 407 added to a portion corresponding to the moving image range 1 (a portion indicated by the moving image range 1) in the image data 401 and the sound data 402 is 28 points obtained by totaling up the scores given to the respective evaluation items in the moving image range 1.

The image pickup apparatus 10 analyzes an image information result and a sound information result obtained from the image data 401 and the sound data 402, determines a score for each evaluation item, and sets a total score obtained by aggregating the scores of the respective evaluation items to be the attribute information 407 to be added to the image data 401 and the sound data 402. As described above, the score of each evaluation item is set so that the more the detection result of each evaluation item matches the conditions desired by the user, the higher the score of each evaluation item. Therefore, the image pickup apparatus 10 is able to efficiently retrieve a portion corresponding to a desired image or sound after the specific sound is generated by means of the attribute information 407 to be added to the image data 401 and the sound data 402.

It should be noted that the image pickup apparatus 10 is similarly able to calculate a total score obtained by totaling up the scores given to the respective evaluation items in the moving image range 2 as the attribute information 407 for a portion corresponding to the moving image range 2 (a portion indicated by the moving image range 2) in the image data 401 and the sound data 402. As indicated by the reference numeral 406, the score given to the evaluation item of the length of the specific sound is 0 point for the period of no specific sound (less than 1 second). The score given to the evaluation item of the subject detection is 5 points, which is the largest score among 5 points for the period during which the subject has been detected and 0 point for the period during which no subject is detected. The score given to the evaluation item of the face orientation is 2 points, which is the largest score among 2 points for the period during which the face orientation is rear and 0 point for the period during which no face is detected. The score given to the evaluation item of the facial expression is 0 point for the period during which there is no information. The score given to the evaluation item of the loudness of the specific sound is 0 point for the period during which there is no specific sound (the loudness of the specific sound is less than small). The score given to the evaluation item of the number of subjects is 5 points, which is the largest score among 5 points for the period during which the number of subjects is one and 0 point for the period during which the number of subjects is zero.

As described above, the attribute information 407 for the portion corresponding to the moving image range 2 (the portion indicated by the moving image range 2) in the image data 401 and the sound data 402 is 12 points obtained by totaling up the scores given to the respective evaluation items in the moving image range 2. In the present embodiment, although the attribute information 407 may be calculated by adopting the largest score as a score given to each evaluation item as described above even with respect to the image data 401 and the sound data 402 during the period after the specific sound is discontinued, the addition of the attribute information 407 is not performed.

Figure 5:
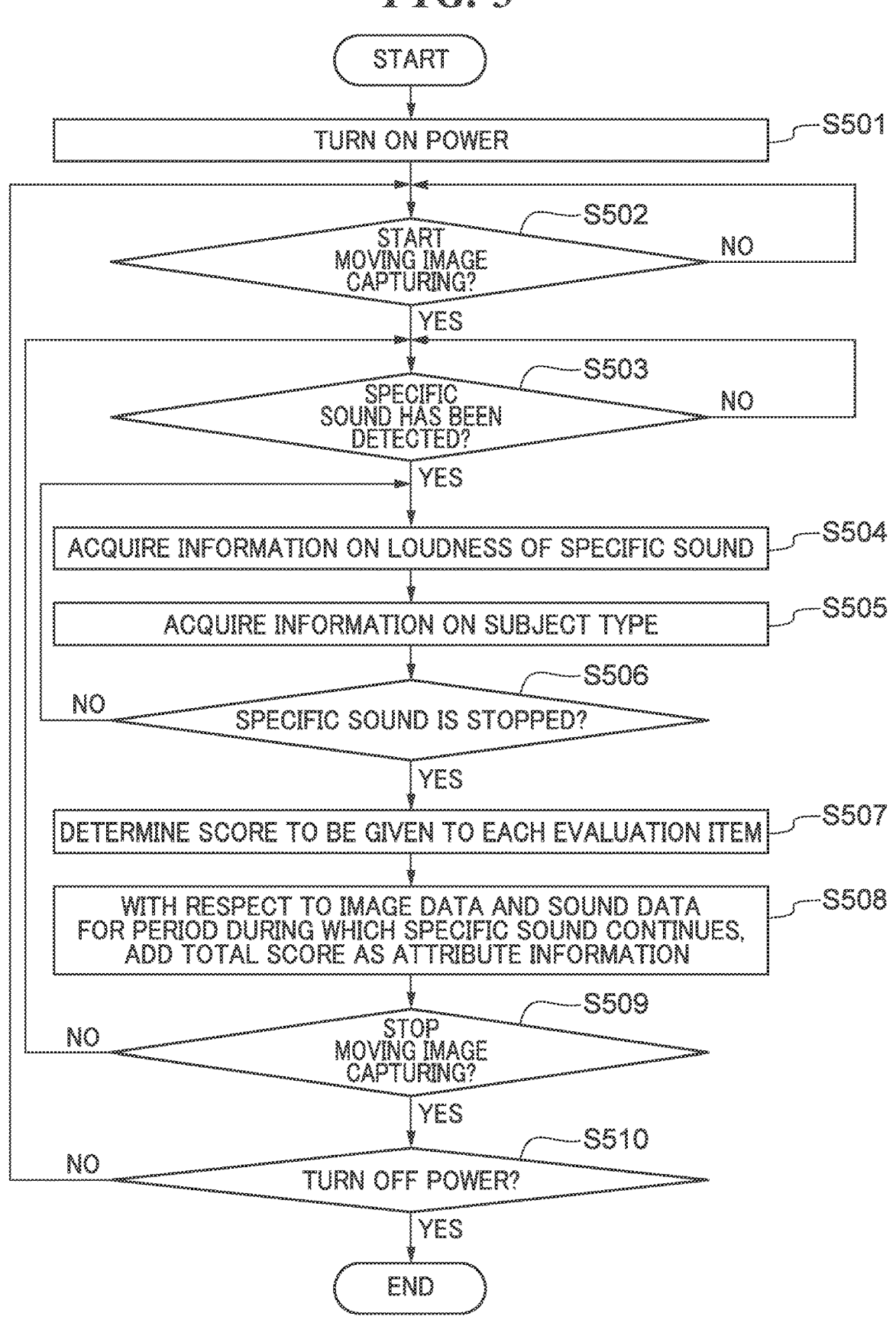
FIG. 5 is a flowchart that shows a method for adding the attribute information to image data and sound data after the image pickup apparatus detects a specific sound.

FIG. 5 is a flowchart that shows a method for adding the attribute information 407 to the image data 401 and the sound data 402 after the image pickup apparatus 10 detects the specific sound. Steps S501 to S510 in the flowchart of FIG. 5 (a control method for the image pickup apparatus) are implemented in such a manner that the CPU (a computer) of the central control unit 201 develops a program stored in the ROM in the RAM and executes the program. As shown in FIG. 5, in the step S501, the central control unit 201 turns on the power of the image pickup apparatus 10. This processing is performed in response to a user's operation on the operation unit 205. In the step S502, the central control unit 201 judges whether or not to start moving image capturing performed by the image pickup apparatus 10. This judgement is performed (made) on the basis of the user's operation on the operation unit 205. In the case that the central control unit 201 judges not to start the moving image capturing performed by the image pickup apparatus 10, the processing returns to the step S502. On the other hand, in the case that the central control unit 201 judges to start the moving image capturing performed by the image pickup apparatus 10, the processing proceeds to the step S503. When the moving image capturing is started, the central control unit 201 stores the image data 401 and the sound data 402 acquired by the moving image capturing in the storage unit 206 (a image pickup step and a sound acquisition step).

In the step S503, the central control unit 201 judges whether or not a specific sound has been detected. This judgement is performed based on detection performed by the sound recognition unit 2043 (a sound recognition step). In the case that the sound recognition unit 2043 recognizes the specific sound, the central control unit judges that the specific sound is detected. As described above, the specific sound is, for example, child's laughing voice, child's crying voice, or child's singing voice. In the case that the central control unit 201 judges that no specific sound is detected, the processing returns to the step S503. On the other hand, in the case that the central control unit 201 judges that a specific sound has been detected, the processing proceeds to the step S504. In the step S504, the central control unit 201 acquires information indicating a loudness of the specific sound. This processing is performed on the basis of judgement performed by the sound recognition unit 2043.

In the step S505, the central control unit 201 acquires information about a subject type (the type of a subject). This acquisition is performed by means of image recognition performed by the image processing unit 203 (an image recognition step). The information about the subject type is information such as the subject detection (the presence or absence of a person), the face orientation, the facial expression, and the number of subjects. In the step S506, the central control unit 201 judges whether or not the specific sound is stopped. This judgement is performed on the basis of detection performed by the sound recognition unit 2043. In the case that the sound recognition unit 2043 does not recognize the specific sound, the central control unit judges that the specific sound is stopped. In the case that the central control unit 201 judges that the specific sound is not stopped, the processing returns to the step S504. On the other hand, in the case that the central control unit 201 judges that the specific sound is stopped, the processing proceeds to the step S507. At that time, the central control unit 201 acquires a time from the detection to the stop of the specific sound, that is, acquires information indicating a length of the specific sound.

In the step S507, the central control unit 201 (a control unit) determines a score to be given to each evaluation item (a control step). Specifically, the central control unit 201 applies the information acquired in the steps S504 to 506 to the score table 301 of FIG. 3. As a result, as shown in FIG. 4, scores to be given to the respective evaluation items in the moving image range 1, that is, scores to be given to the length of the specific sound, the subject detection (the presence or absence of a person), the face orientation, the facial expression, the loudness of the specific sound, and the number of subjects in the moving image range 1 are determined. Therefore, in the case that two or more scores are given to one evaluation item, the central control unit 201 determines the largest score among the two or more scores as the score to be given to the one evaluation item.

In the step S508, the central control unit 201 aggregates the scores given to the respective evaluation items in the step S507 to calculate a total score. Furthermore, the central control unit 201 (the control unit) stores the total score in the storage unit 206 in a state where the total score is added as the attribute information 407 to the image data 401 and the sound data 402 during the period during which the specific sound continues (a control step). In the specific example of FIG. 4, 28 points that is the total score are added as the attribute information 407 to the portion corresponding to the moving image range 1 in the image data 401 and the sound data 402.

In the step S509, the central control unit 201 judges whether or not to stop the moving image capturing performed by the image pickup apparatus 10. This judgement is performed (made) on the basis of the user's operation on the operation unit 205. In the case that the central control unit 201 judges not to stop the moving image capturing performed by the image pickup apparatus 10, the processing returns to the step S503. On the other hand, in the case that the central control unit 201 judges to stop the moving image capturing performed by the image pickup apparatus 10, the processing proceeds to the step S510. In the step S510, the central control unit 201 judges whether or not to turn off the power of the image pickup apparatus 10. This judgement is performed on the basis of the user's operation on the operation unit 205. In the case that the central control unit 201 judges not to turn off the power of the image pickup apparatus 10, the processing returns to the step S502. On the other hand, in the case that the central control unit 201 judges to turn off the power of the image pickup apparatus 10, the central control unit 201 turns off the power of the image pickup apparatus 10 and ends the flowchart of FIG. 5.

As described above, according to the present embodiment, after the sound recognition unit 2043 detects the specific sound, the image pickup apparatus 10 calculates the weighted score according to the sound recognition result acquired by the sound recognition unit 2043 and the image recognition result acquired by the image processing unit 203. Further, the image pickup apparatus 10 adds the calculated weighted score to the image data 401 and the sound data 402 as the attribute information 407. As a result, the image pickup apparatus 10 is able to easily retrieve desired-state image and sound portions from the stored image data 401 and the stored sound data 402 after the specific sound is generated by means of (through) the attribute information 407 added to the image data 401 and the sound data 402. In addition, in the image pickup apparatus 10, the attribute information 407 calculated by adopting the largest score as the score given to each evaluation item is added to the image data 401 and the sound data 402 for the period during which the specific sound can be detected. As a result, the user is able to easily retrieve the image data 401 and the sound data 402 during a desired period.

Although the preferred embodiment of the present invention has been described above, the present invention is not limited to the present embodiment, and various variations and changes can be made within the scope of the gist of the present invention. For example, in the present embodiment, regardless of what the total score which is the attribute information 407 is, the attribute information 407 is added to the portion corresponding to the moving image range 1, which is the period during which the specific sound continues, in the image data 401 and the sound data 402. However, the attribute information 407 may be added to the corresponding portion only in the case that the total score which is the attribute information 407 is equal to or large than a predetermined value. In this case, as compared with the present embodiment, it is highly likely that a subject in a desired state after the specific sound is generated is captured in the portion to which the attribute information 407 is added.

Furthermore, even in the case that the total score which is the attribute information 407 is less than the predetermined value, the attribute information 407 may be added to a portion where the sound recognition unit 2043 detects the specific sound and the image processing unit 203 detects the subject (a person). In this case, it is likely that a subject close to the desired state after the specific sound is generated is captured in the portion to which the attribute information 407 is added.

Furthermore, the image pickup apparatus 10 may be configured to store only the portion corresponding to the moving image range 1, to which the attribute information 407 is added, in the image data 401 and the sound data 402. The storage (storing) may be performed by the central control unit 201 as storage (storing) in the storage unit 206, or as storage (storing) in an external storage device (a storage unit) connected to the external input/output terminal unit 208 or the wireless unit 214. As a result, the image pickup apparatus 10 is able to efficiently store the above-described retrieved result.

Furthermore, the image pickup apparatus 10 may be configured to be able to select at least one of all the total scores added as the attribute information 407 to the image data 401 and the sound data 402 in response to the user's operation on the operation unit 205 functioning as an evaluation selection unit. In this case, the image pickup apparatus 10 stores only a portion, to which the total score selected by the user's operation is added as the attribute information 407, in the image data 401 and the sound data 402. The storage (storing) may be performed by the central control unit 201 as storage (storing) in the storage unit 206, or as storage (storing) in the external storage device connected to the external input/output terminal unit 208 or the wireless unit 214. By using the evaluation selection unit, the user is able to select and store the above-described retrieved result. It should be noted that the storage (storing) is performed at a timing when the user stops the moving image capturing.

Furthermore, in the score table 301, the score for each evaluation item may be changeable in response to the user's operation on the operation unit 205 functioning as a score change unit. Since the weighted score can be changed by means of the score change unit, the user is able to customize the weighted score so that the weighted score matches the condition desired by the user himself/herself.

Furthermore, in the score table 301, the evaluation item, to which the weighted score is given, may be selectable in response to the user's operation on the operation unit 205 functioning as an item selection unit. In this case, the user is able to select at least one of the subject detection, the face orientation, the facial expression, and the number of subjects, which are the evaluation items in the case that the recognition method is the image recognition, as target(s) to which the score(s) is/are given when the attribute information 407 is calculated. Furthermore, the user is able to select at least one of the loudness of the specific sound and the length of the specific sound, which are the evaluation items in the case that the recognition method is the sound recognition, as the target(s) to which the score(s) is/are given when the attribute information 407 is calculated. By using the item selection unit, the user is able to customize the evaluation item(s) of the target(s), to which the score(s) is/are given when the attribute information 407 is calculated, so that the evaluation item(s) of the target(s), to which the score(s) is/are given when the attribute information 407 is calculated, matches the condition desired by the user himself/herself.

Furthermore, in the present embodiment, the attribute information 407 is added to the portion corresponding to the moving image range 1, which is the period during which the specific sound continues, in the image data 401 and the sound data 402. However, the attribute information 407 may be added to a period, during which the detection of the subject continues, in the image data 401 and the sound data 402 after the specific sound has been detected by the sound recognition unit 2043. In either case, since the attribute information 407 is added to a portion of the image data 401 and the sound data 402 that are continuous from the start to the end of the moving image capturing, it is possible to easily retrieve the desired-state image and sound portions after the specific sound is generated.

Furthermore, as shown in FIG. 6, an evaluation item of a length of the time required to change the angle of view to the sound direction may be added to the evaluation items in the case that the recognition method is the sound recognition. That is, a score table 601 shown in FIG. 6 is obtained by adding the evaluation item of the length of the time required to change the angle of view to the sound direction to the evaluation items in the case that the recognition method is the sound recognition in the score table 301 shown in FIG. 3. The time required to change the angle of view to the sound direction is a time required from the time at which the sound recognition unit 2043 detects the specific sound until the image capturing direction (the photographing direction) of the image pickup apparatus 10 coincides with the sound direction. According to the score table 601, with respect to the evaluation item of the length of the time required to change the angle of view to the sound direction, 5 points are given in the case that the length of the time required to change the angle of view to the sound direction is less than 1 second, and 4 points are given in the case that the length of the time required to change the angle of view to the sound direction is 1 second or more and less than 2 seconds. In addition, with respect to the evaluation item of the length of the time required to change the angle of view to the sound direction, 3 points are given in the case that the length of the time required to change the angle of view to the sound direction is 2 seconds or more and less than 3 seconds, 2 points are given in the case that the length of the time required to change the angle of view to the sound direction is 3 seconds or more and less than 4 seconds, and 1 point is given in the case that the length of the time required to change the angle of view to the sound direction is 4 seconds or more and less than 5 seconds. However, in the case that the length of the time required to change the angle of view to the sound direction is 5 seconds or more, no point (0 point) is given. As a result, it is possible to improve the comprehensive evaluation of the specific sound in the image data 401 and the sound data 402.

Furthermore, in the present embodiment, the attribute information 407 is added to the portion corresponding to the moving image range 1, which is the period during which the specific sound continues, in the image data 401 and the sound data 402. The attribute information 407 may be added to the portion corresponding to the moving image range 2, which is the period after the specific sound is discontinued. In this case, 12 points that is the total score are added as the attribute information 407 to the portion corresponding to the moving image range 2.

Furthermore, the addition of the attribute information 407 to the image data 401 and the sound data 402 may be performed by an image processing apparatus separate from the image pickup apparatus 10. For example, the image processing apparatus may be a desktop or notebook (laptop) personal computer (PC), a tablet terminal, a smartphone, or the like. In this case, the image data 401 and the sound data 402 are transmitted from the image pickup apparatus 10 to the image processing apparatus separate from the image pickup apparatus 10 via the external input/output terminal unit 208 or the wireless unit 214.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-151345, filed on Sep. 22, 2022, which is hereby incorporated by reference herein in its entirety.

What is claimed is:

1. An image pickup apparatus comprising:
an image pickup circuit;
a CPU; and a memory that stores a program that, when executed by the CPU, causes the image pickup apparatus to function as the following units:
a sound acquisition unit that acquires a sound;
a sound recognition unit that recognizes a sound acquired by the sound acquisition unit during moving image capturing performed by the image pickup circuit and detects a specific sound from the sound;
an image recognition unit that recognizes a moving image acquired by the image pickup circuit during the moving image capturing performed by the image pickup circuit and detects a subject from the moving image; and
a control unit that calculates an evaluation result by using a score weighted according to a sound recognition result acquired by the sound recognition unit and an image recognition result acquired by the image recognition unit and adds the evaluation result to the moving image and the sound as attribute information, and
wherein the control unit does not add the attribute information including the evaluation result from a start of capturing of the moving image until the sound recognition unit detects the specific sound and adds the attribute information including the evaluation result after the sound recognition unit detects the specific sound.

2. The image pickup apparatus according to claim 1, wherein
the control unit uses a score weighted according to at least one of a length of the specific sound and a loudness of the specific sound that are detected by the sound recognition unit as a score weighted according to the sound recognition result.

3. The image pickup apparatus according to claim 1, wherein
the control unit uses a score weighted according to a type of the subject detected by the image recognition unit as a score weighted according to the image recognition result.

4. The image pickup apparatus according to claim 3, wherein
the type of the subject is at least one of presence or absence of a person, a facial expression of a person, an orientation of a face of a person, and the number of persons.

5. The image pickup apparatus according to claim 1, wherein
the program, when executed by the CPU, further causes the image pickup apparatus to function as the following unit:
a judging unit that judges a direction, in which the specific sound comes toward the image pickup apparatus, as a sound direction, and
wherein the control unit uses a score weighted according to a length of a time required from when the sound recognition unit detects the specific sound until the image pickup apparatus faces the sound direction as a score weighted according to the sound recognition result.

6. The image pickup apparatus according to claim 1, wherein
the program, when executed by the CPU, further causes the image pickup apparatus to function as the following unit:
a score change unit that allows a user to change a score weighted according to the sound recognition result or a score weighted according to the image recognition result.

7. The image pickup apparatus according to claim 1, wherein the program, when executed by the CPU, further causes the image pickup apparatus to function as the following unit:

an item selection unit that allows a user to select an evaluation item as a target of a score weighted according to the sound recognition result or an evaluation item as a target of a score weighted according to the image recognition result.

8. The image pickup apparatus according to claim 1, wherein in a case that two or more scores weighted according to the sound recognition result are given to one evaluation item for the sound recognition result due to a change in the specific sound detected by the sound recognition unit, the control unit gives a largest score to the one evaluation item.

9. The image pickup apparatus according to claim 1, wherein in a case that two or more scores weighted according to the image recognition result are given to one evaluation item for the image recognition result due to a change in the subject detected by the image recognition unit, the control unit gives a largest score to the one evaluation item.

10. The image pickup apparatus according to claim 1, wherein the control unit adds the attribute information to a first portion, in which detection of the specific sound performed by the sound recognition unit is continued, or a second portion, in which detection of the subject performed by the image recognition unit is continued after the detection of the specific sound by the sound recognition unit has discontinued, in the moving image and the sound.

11. The image pickup apparatus according to claim 10, wherein the control unit adds the attribute information to a third portion, in which the evaluation result is equal to or greater than a predetermined value, in the first portion and the second portion.

12. The image pickup apparatus according to claim 11, wherein the control unit adds the attribute information to a fourth portion, in which the evaluation result is not equal to or greater than the predetermined value, the sound recognition unit detects the specific sound, and the image recognition unit detects a person, in the first portion and the second portion.

13. The image pickup apparatus according to claim 10, wherein the control unit stores the first portion and the second portion, to which the attribute information is added, in the moving image and the sound in a storage unit.

14. The image pickup apparatus according to claim 13, wherein the program, when executed by the CPU, further causes the image pickup apparatus to function as the following unit:

an evaluation selection unit that allows a user to select at least one of a plurality of evaluation items, and wherein the control unit stores the first portion and the second portion, to which the evaluation result of the evaluation item selected by the evaluation selection unit is added as the attribute information, in the moving image and the sound in the storage unit.

15. A control method for an image pickup apparatus, the control method comprising:

acquiring a sound;

recognizing a sound acquired during moving image capturing and detecting a specific sound from the sound;

recognizing a moving image acquired during the moving image capturing and detecting a subject from the moving image; and calculating an evaluation result by using a score weighted according to a sound recognition result and an image recognition result and adding the evaluation result to the moving image and the sound as attribute information, and wherein the attribute information including the evaluation result is not added from a start of capturing of the moving image until the specific sound is detected, and the attribute information including the evaluation result is added after the specific sound is detected.

16. A non-transitory computer-readable storage medium storing a program for causing a computer to execute a control method for an image pickup apparatus, the control method comprising:

acquiring a sound;

recognizing a sound acquired during moving image capturing and detecting a specific sound from the sound;

recognizing a moving image acquired during the moving image capturing and detecting a subject from the moving image; and calculating an evaluation result by using a score weighted according to a sound recognition result and an image recognition result and adding the evaluation result to the moving image and the sound as attribute information, and wherein the attribute information including the evaluation result is not added from a start of capturing of the moving image until the specific sound is detected, and the attribute information including the evaluation result is added after the specific sound is detected.

* * * * *